United States Patent
Zhao

(10) Patent No.: US 9,977,538 B2
(45) Date of Patent: May 22, 2018

(54) TOUCH DISPLAY SUBSTRATE, TOUCH DISPLAY PANEL AND TOUCH DISPLAY APPARATUS

(71) Applicant: BOE TECHNOLOGY GROUP CO., LTD, Beijing (CN)

(72) Inventor: Lijun Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 15/125,858

(22) PCT Filed: Aug. 14, 2015

(86) PCT No.: PCT/CN2015/086945
§ 371 (c)(1),
(2) Date: Sep. 13, 2016

(87) PCT Pub. No.: WO2016/101629
PCT Pub. Date: Jun. 30, 2016

(65) Prior Publication Data
US 2017/0003822 A1    Jan. 5, 2017

(30) Foreign Application Priority Data
Dec. 23, 2014 (CN) .......................... 2014 1 0815666

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 3/0416* (2013.01); *G06F 2203/04111* (2013.01)

(58) Field of Classification Search
None
See application file for complete search history.

(56) References Cited

U.S. PATENT DOCUMENTS

2012/0119979 A1* 5/2012 Nakayasu ............ G09G 3/3648
345/30
2014/0118277 A1* 5/2014 Kim ........................ G06F 3/044
345/173
(Continued)

FOREIGN PATENT DOCUMENTS

CN    103049155 A    4/2013
CN    103135862 A    6/2013
(Continued)

OTHER PUBLICATIONS

Genchu-machine translation_CN103455225_pub._date—Dec. 18, 2013.*
(Continued)

*Primary Examiner* — Alexander Eisen
*Assistant Examiner* — Alexander Yi
(74) *Attorney, Agent, or Firm* — Anova Law Group, PLLC

(57) ABSTRACT

A touch display panel is provided. The touch display panel includes a plurality of touch driving electrodes and a plurality of touch sensing electrodes intersecting with and electrically insulated from the plurality of the touch driving electrodes. An individual touch driving electrode of the plurality of touch driving electrodes has an outer contour and an inner contour, the inner contour at least partially defining an area allowing a common electrode to be disposed therein, and an area of the individual touch driving electrode is substantially less than that defined by the outer contour.

13 Claims, 5 Drawing Sheets

(56) References Cited

U.S. PATENT DOCUMENTS

| | | | |
|---|---|---|---|
| 2014/0247244 A1 | 9/2014 | Wang et al. | |
| 2014/0347318 A1* | 11/2014 | Kim | G06F 3/044 345/174 |
| 2015/0177897 A1* | 6/2015 | Choi | G06F 3/044 345/174 |
| 2016/0048267 A1* | 2/2016 | Lee | G06F 3/0418 345/173 |

FOREIGN PATENT DOCUMENTS

| | | |
|---|---|---|
| CN | 103455225 A | 12/2013 |
| CN | 203350823 U | 12/2013 |
| CN | 203759678 U | 8/2014 |
| CN | 104461154 A | 3/2015 |
| CN | 204270270 U | 4/2015 |
| JP | 2014149705 A | 8/2014 |

OTHER PUBLICATIONS

The World Intellectual Property Organization (WIPO) International Search Report for PCT/CN2015/086945 dated Oct. 15, 2015 p. 1-5.
The State Intellectual Property Office of the People's Republic of China (SIPO) Office Action 1 for 201410815666.2 dated Dec. 13, 2016 pp. 1-15.

* cited by examiner

TOUCH DISPLAY SUBSTRATE, TOUCH DISPLAY PANEL AND TOUCH DISPLAY APPARATUS

CROSS-REFERENCES TO RELATED APPLICATIONS

This application is a national phase entry under 35 U.S.C. § 371 of International Application No. PCT/CN2015/086945, filed on Aug. 14, 2015, which claims the priority of Chinese Patent Application CN201410815666.2, filed on Dec. 23, 2014 The above enumerated patent applications are incorporated by reference herein in their entirety.

FIELD OF THE DISCLOSURE

The present invention generally relates to the field of display technologies and, more particularly, relates to a touch display substrate, a touch display panel, and a touch display apparatus.

BACKGROUND

FIG. 1 illustrates a schematic view of a conventional touch display substrate. As shown in FIG. 1, the touch display substrate includes touch driving electrodes 010 extended in a horizontal direction and touch sensing electrodes 030 extended in a vertical direction. The touch driving electrodes 010 and the common electrode lines 020 are formed into one structure in the touch display substrate. When driving a touch display panel having such touch display substrate, a display cycle is divided into two alternating phases: a display phase and a touch-control phase. In the display phase, the touch driving electrodes 010 serve as the common electrode lines 020 and carry common signals. In the touch-control phase, the touch driving electrodes 010 carry touch driving signals.

However, in the touch display substrate shown in FIG. 1, the touch driving electrodes have relatively greater width and hence relatively greater parasitic capacitance, which in turn may cause longer delay to touch driving signals during the touch driving phase, reducing the touch sensitivity of the touch display substrate.

The disclosed method and system are directed to solve one or more problems set forth above and other problems in the art.

BRIEF SUMMARY OF THE DISCLOSURE

The present disclosure provides a touch display substrate, a touch display panel having the touch display substrate, and a touch display apparatus having the touch display panel with improved touch sensitivity.

One aspect of the present disclosure provides a touch display panel. The touch display panel includes a plurality of touch driving electrodes and a plurality of touch sensing electrodes intersecting with and electrically insulated from the plurality of the touch driving electrodes. An individual touch driving electrode of the plurality of touch driving electrodes has an outer contour and an inner contour, the inner contour at least partially defining an area allowing a common electrode to be disposed therein, and an area of the individual touch driving electrode is substantially less than that defined by the outer contour.

Optionally, the outer contour is an overall outside shape occupied by the touch driving electrode; and the inner contour is an overall inside void within the touch driving electrode.

Optionally, the outer contour has a quadrangular shape; and the inner contour defines the area for the common electrode to increase a total number of edges of the individual touch driving electrode contributing to fringe field capacitance between the touch driving electrode and a corresponding touch sensing electrode.

Optionally, the individual touch driving electrode is in a shape of an enclosed frame with a hollow center portion as the inner contour.

Optionally, the individual touch driving electrode is in a shape of an open frame with a hollow center portion as the inner contour.

Optionally, the touch display panel further includes a plurality of common electrode line leads supplying common electrode signals to the plurality of common electrodes lines. The common electrode line leads and the common electrode lines are formed at a same layer.

Optionally, the touch display panel further includes a plurality of common electrode lines positioned within and confined by the inner contours of the plurality of touch driving electrodes, the common electrode lines being electrically insulated from the touch driving electrodes.

Optionally, the touch display panel further includes a plurality of common electrode line leads supplying common electrode signals to the plurality of common electrodes lines. The common electrode line leads and the common electrode lines are formed in different layers; and the common electrode line leads are electrically connected to the common electrode lines through via holes.

Optionally, each touch sensing electrode includes two vertical portions extended in a direction perpendicular to a length direction of the touch driving electrode, and two first connecting portions connecting with the two vertical portions at both ends of the touch sensing electrode.

Optionally, the touch sensing electrode further includes a plurality of second connecting portions positioned between the two first connecting portions; and the second connecting portions connect with the two vertical portions to form an H-type structure.

Optionally, projection of the second connecting portions onto a layer forming the touch driving electrodes falls within areas confined by the inner contours of the touch driving electrodes.

Optionally, the touch display panel further includes a plurality of touch driving electrode leads for respectively supplying touch driving signals to the plurality of touch driving electrodes during a touch driving phase of the touch display panel, and for respectively common voltage signals to touch driving electrodes during the display phase, when the plurality of touch driving electrodes also serve as common electrode lines.

Another aspect of the present disclosure provides a touch display apparatus. The touch display apparatus includes the above disclosed touch display panel.

Another aspect of the present disclosure provides a touch display panel. The touch display panel includes a plurality of touch driving electrodes on a first substrate and a plurality of touch sensing electrodes on a second substrate, the touch sensing electrodes intersecting with and electrically insulated from the plurality of the touch driving electrodes. Each touch sensing electrode includes one or more longitudinal portions, and a plurality of lateral portions distributed along said one or more longitudinal portions; projection of the lateral portions onto the first substrate overlapping with the touch driving electrodes.

Optionally, each touch sensing electrode includes four longitudinal portions extended in a direction perpendicular to a length direction of the touch driving electrodes, two first connecting portions connecting with the four longitudinal portions at both ends of the touch sensing electrode, and two second connecting portions connecting the four longitudinal portions.

Optionally, each touch sensing electrode includes one longitudinal portion extended in a direction perpendicular to a length direction of the touch driving electrodes, and a plurality of connecting portions connecting with the longitudinal portion.

Another aspect of the present disclosure provides a touch display apparatus. The touch display apparatus includes the above disclosed touch display panel.

Another aspect of the present disclosure provides a driving method for a touch display panel. The touch display panel includes a plurality of touch driving electrodes and a plurality of touch sensing electrodes intersecting with and electrically insulated from the plurality of the touch driving electrodes. An individual touch driving electrode of the plurality of touch driving electrodes has an outer contour and an inner contour, the inner contour is configured to allow a common electrode to be disposed within, and an area of the individual touch driving electrode is substantially less than that of the outer contour. The driving methods includes supplying touch driving signals to the touch driving electrodes in a touch driving phase, and supplying a common voltage signal to the touch driving electrodes in a display phase.

Optionally, the touch driving signals are pulse scanning signals; and the common voltage signal is a constant DC voltage signal.

Optionally, the touch display panel further includes a plurality of common electrode lines positioned within and confined by the inner contours of the plurality of touch driving electrodes, the common electrode lines are electrically insulated from the touch driving electrodes, and the supplying the common voltage signal to the touch driving electrodes in the display phase further includes supplying the common voltage signal to the touch driving electrodes and the common voltage signal to the common electrode lines in the display phase; and supplying no signal or a constant DC voltage signal to the common electrode lines in the touch driving phase.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Figure 6:
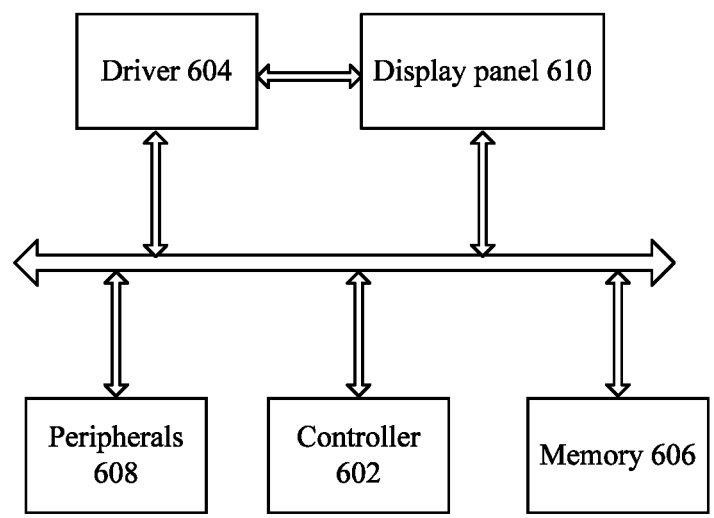
FIG. 6 illustrates an exemplary display apparatus incorporating certain disclosed embodiments.

The present disclosure provides a touch display apparatus. The display apparatus may be any appropriate apparatus or component with certain display function, such as an LCD panel, an LCD TV, a monitor, a cell phone or smart phone, a computer, a tablet, or a navigation system, etc. The touch display apparatus includes a touch display panel, and the touch display panel includes a touch display substrate. FIG. 6 illustrates an exemplary display apparatus incorporating certain disclosed embodiments.

As shown in FIG. 6, display apparatus includes a controller 602, driver circuitry 604, memory 606, peripherals 608, and a display panel 610. Certain devices may be omitted and other devices may be included.

The controller 602 may include any appropriate processor or processors, such as a general-purpose microprocessor, digital signal processor, and/or graphic processor. Further, the controller 602 can include multiple cores for multi-thread or parallel processing. The memory 606 may include any appropriate memory modules, such as read-only memory (ROM), random access memory (RAM), flash memory modules, and erasable and rewritable memory, and other storage media such as CD-ROM, U-disk, and hard disk, etc. The memory 606 may store computer programs for implementing various processes, when executed by the controller 602.

Peripherals 608 may include any interface devices for providing various signal interfaces, such as USB, HDMI, VGA, DVI, etc. Further, peripherals 608 may include any input and output (I/O) devices, such as keyboard, mouse, and/or remote controller devices. Peripherals 608 may also include any appropriate communication module for establishing connections through wired or wireless communication networks.

The driver circuitry 604 may include any appropriate driving circuits to drive the display panel 610. The display panel 610 may include any appropriate flat panel display, such as an LCD panel, an LED-LCD panel, a plasma panel, an OLED panel, etc. During operation, the display 610 may be provided with image signals by the controller 602 and the driver circuitry 604 for display. The driving circuitry 604 may also be included in the display panel 610.

In certain embodiments, display panel 610 may include an LCD panel, such as a thin-film-transistor (TFT) LCD panel, or an OLED panel. The display panel may include a first or a front substrate, a second or a rear substrate, and liquid crystal filled between the substrates. The first substrate may be a color-filter substrate for forming a color-filter film and the second substrate may be an array substrate for forming an active matrix, e.g., a TFT array. When a substrate (e.g., a color-filter substrate or an array substrate) is manufactured, the substrate may be manufactured individually, or multiple substrates may be manufactured together as part of a large substrate before being cut into individual substrates later.

Figure 1:
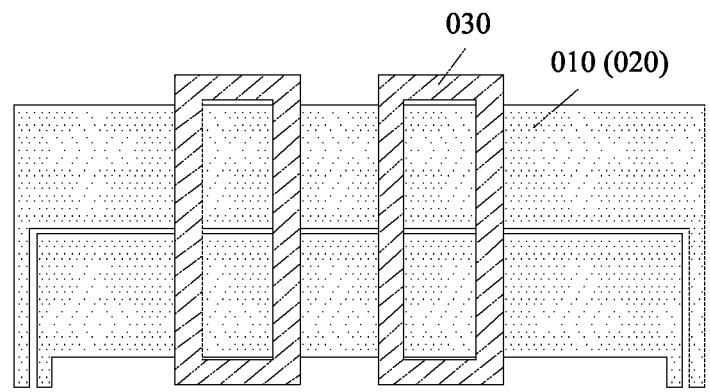
FIG. 1 illustrates a schematic view of touch driving electrodes and touch sensing electrodes in a conventional touch display substrate.
Figure 2:
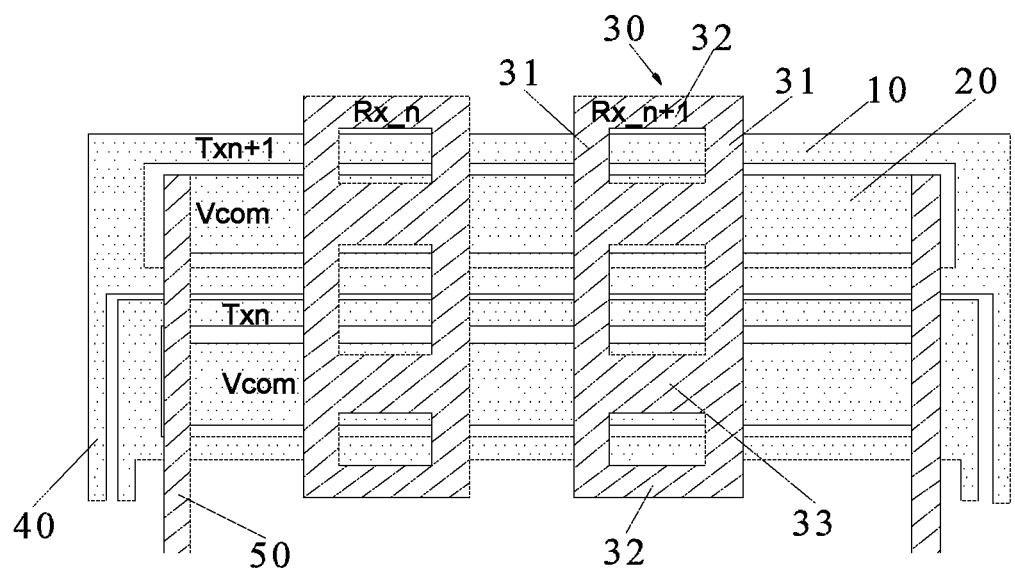
FIG. 2 illustrates a schematic view of touch driving electrodes, common electrode lines and touch sensing electrodes in an exemplary touch display substrate according to one embodiment of the present disclosure.

FIG. 2 illustrates an exemplary touch display substrate according to certain disclosed embodiments. As shown in FIG. 2, the touch display substrate includes a plurality of touch driving electrodes 10 and a plurality of touch sensing electrodes 30. The plurality of touch sensing electrodes 30 may orthogonally intersect with the plurality of touch driving electrodes 10 in separate layers and may be electrically insulated from each other. An individual touch driving electrode 10 may be separated into a touch driving electrode 10 that has a special pattern and a common electrode line 20. A middle portion of the touch driving electrode 10 may be omitted or removed to form the special pattern of the touch driving electrode 10. The common electrode line 20 may be formed in the place of the removed portion of the touch driving electrode 10. The touch driving electrode 10 and the common electrode line 20 may not be connected.

Figure 3:
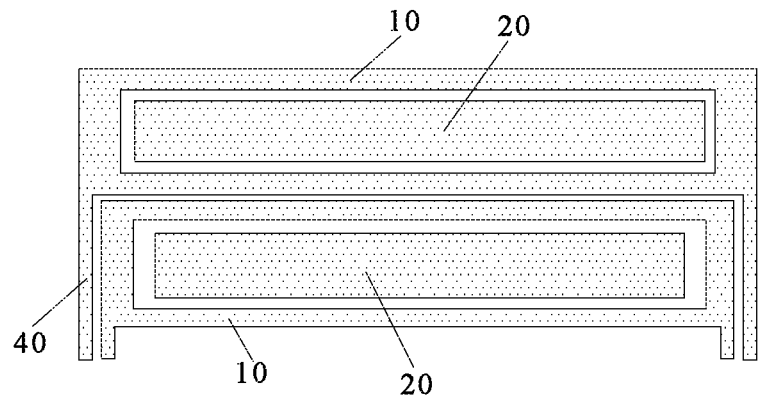
FIG. 3 illustrates a schematic view of touch driving electrodes and common electrode lines according to one embodiment of the present disclosure.
Figure 5:
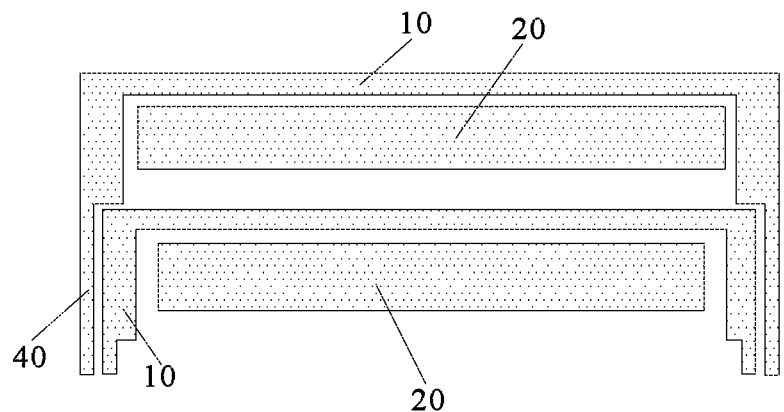
FIG. 5 illustrates a schematic view of touch driving electrodes according to another embodiment of the present disclosure.

FIGS. 2, 3 and 5 only show two touch driving electrodes 10, two common electrode lines 20 and two touch sensing electrodes 30. However, a practical touch display substrate may have far more than two-electrode structures of each type. As shown in FIG. 2, two touch driving electrodes 10 are denoted as Txn and Txn+1. Two touch sensing electrodes 30 are denoted as Rxn and Rxn+1. Two common electrode lines are denoted as Vcom. The n and n+1 notation indicates that only two structures of each type among many are shown in FIG. 2.

Figure 7:
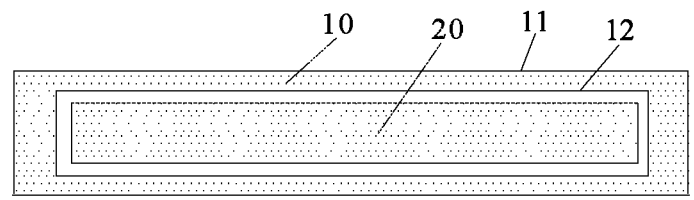
FIG. 7 illustrates a schematic view of a touch driving electrodes and common electrode according to one embodiment of the present disclosure.
Figure 8:
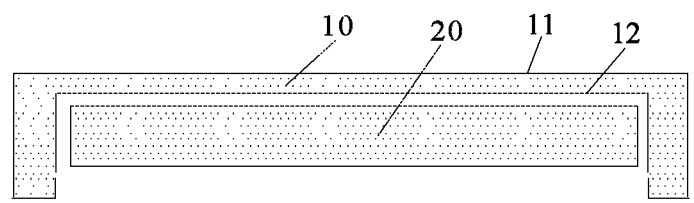
FIG. 8 illustrates a schematic view of a touch driving electrode and common electrode according to another embodiment of the present disclosure.

FIG. 7 illustrates a schematic view of a touch driving electrode and a common electrode according to one embodiment of the present disclosure. FIG. 8 illustrates a schematic view of a touch driving electrode and a common electrode according to another embodiment of the present disclosure.

As shown in FIGS. 7-8, the touch driving electrode 10 may include an outer contour 11 and an inner contour 12. The outer contour of a touch driving electrode may refer to an overall outside shape occupied by the touch driving electrode, while the inner contour of the touch driving electrode may refer to an overall inside void within the touch driving electrode. When the inner contour has a substantial area, the touch driving electrode 10 may occupy an area substantially smaller than the outer contour area 11, and the touch driving electrode 10 may also have increased number of edges introduced by having the inner contour.

The outer contour 11 of a touch driving electrode 10 may be formed in various ways. For example, the outer contour 11 of the touch driving electrode 10 may be formed by straight lines. The outer contour 11 of the touch driving electrode 10 may be formed by curved lines. Further, the outer contour 11 of the touch driving electrode 10 may be formed by a combination of straight lines and curved lines.

When the outer contour 11 of the touch driving electrode 10 is formed by straight lines, the outer contour 11 of the touch driving electrode 10 may be in a shape of a convex polygon, as shown in FIGS. 2-3 and 7. For example, the touch driving electrode 10 may be formed in an enclosed frame shape and, in addition to an outer contour 11, the touch driving electrode 10 may also have an inner contour 12. The area occupied by the touch driving electrode 10 is defined as the area between the inner contour 12 of the touch driving electrode 10 and the outer contour 11 of the touch driving electrode 10.

Further, the outer contour 11 of the touch driving electrode 10 may be in a shape of a concave polygon, as shown in FIGS. 5 and 8. An outer contour 11 area of the touch driving electrode 10 may be defined as the area of the convex polygon formed by connecting the two vertices adjacent to one or more adjacent recessed vertices (a recessed vertex has an interior angle greater than 180 degrees) of the concave polygon of the touch driving electrode 10. The area occupied by the touch driving electrode 10 is simply the area of the concave polygon shape of the touch driving electrode 10.

When the outer contour 11 of the touch driving electrode 10 is formed in curved lines, the outer contour 11 of the touch driving electrode 10 may be in a shape of a convex curve shape. As used herein, a convex curve shape may refer to a closed two dimensional graph where the entire graph is on one side of a tangential line at any point on the graph. For example, a circle or an oval, etc., is such a convex curve shape. The calculation of the outer contour 11 area and the area occupied by the touch driving electrode 10 itself may be performed similar to the calculation described above.

Further, the outer contour 11 of the touch driving electrode 10 may be in a shape of a concave curve shape. As used herein, a concave curve shape may refer to a closed two dimensional graph where the entire graph is on one or both sides of a tangential line at any point on the graph. The calculation of the outer contour 11 area and the area occupied by the touch driving electrode 10 itself may be performed similar to the calculation described above.

The outer contour 11 of the touch driving electrode 10 may also be formed in a combination of straight lines and curved lines. For example, the outer contour 11 of the touch driving electrode 10 may be in a shape of an annular sector. The calculation of the outer contour 11 area and the area occupied by the touch driving electrode 10 itself may be performed similar to the calculation described above.

The touch driving electrode 10 may be made of a conductive material. The touch driving electrode 10 may be formed in a shape of enclosed frame (as shown in FIGS. 2-3 and 7) or in a shape of indented or open frame (as shown in FIGS. 5 and 8). Thus, the width of the conductive material portion of the touch driving electrode 10 may be substantially small and the area of the touch driving electrode 10 may also be substantially small.

Thus, the disclosed touch display substrate provides the touch driving electrodes 10 with reduced area. When touch driving signals are supplied to the touch driving electrodes 10, the touch driving electrodes 10 have substantially small parasitic capacitance between the touch driving electrodes 10 and other conductive elements of the touch display substrate (such as gate electrode, source/drain electrodes of thin film transistors, data lines, and pixel electrodes, etc.).

Further, while the touch driving electrodes 10 have reduced-area conductive material portions, the touch driving electrodes 10 have increased number of edges. The effective capacitance in the touch-control phase of the touch display substrate is the total fringe field capacitance between the edges of the touch driving electrodes 10 and the touch sensing electrodes 30. Because the number of edges of the touch driving electrodes 10 increases and the intensity of the signals supplied to the touch driving electrodes 10 can remain the same, the total fringe field capacitance increases. Thus, the touch sensitivity of the touch display substrate is improved.

The touching of the touch panel by a human finger affects the fringe field capacitance between the touch sensing electrodes 30 and the touch driving electrodes 10. The touch position is determined by sensing the change of the fringe field capacitance.

To increase the fringe electric field between the touch driving electrodes 10 and the touch sensing electrodes 30, the outer contour 11 of the touch driving electrodes 10 may be formed in a shape of quadrangular. Each driving electrode 10 may have more than four edges. Each edge of the touch driving electrodes 10 generates a fringe electric field with a corresponding touch sensing electrode 30. Thus, with many edges, the touch driving electrode 10 generates more fringe electric fields. Thus, the touch sensitivity of the disclosed touch display substrate is improved.

In one embodiment, as shown in FIGS. 2-3 and 7, each touch driving electrode 10 may be formed in a shape of enclosed frame having a hollow middle portion. As such, the touch driving electrode 10 may have 8 edges. When touch driving signal is supplied to the touch driving electrode 10, fringe electric field is generated between each edge of the touch driving electrode 10 and the corresponding touch sensing electrode 30. Thus, the touch display substrate having the touch driving electrodes 10 as shown in FIGS. 2-3 and 7 may have substantially high touch sensitivity.

To implement the display function, the touch display substrate also includes common electrode lines 20. In an in-cell touch display panel, the common electrode line 20 and the touch driving electrode 10 may be configured in a same layer and are electrically insulated from one another. As shown in FIGS. 3, 5, 7 and 8, the common electrode line 20 is configured in an area confined by the inner contour 12 of the touch driving electrode 10 to increase the aperture ratio of the touch display substrate.

As shown in FIGS. 3 and 7, the touch driving electrode 10 is formed in a shape of an enclosed frame. Accordingly, the common electrode line 20 is configured in the hollow middle portion of the enclosed frame. As shown in FIGS. 5 and 8, the touch driving electrode 10 is in a shape of indented frame. Accordingly, the common electrode line 20 is configured in a semi-enclosed area confined by the inner contour 12 of the indented frame. In other words, the inner contour at least partially defines an area allowing a common electrode to be disposed therein, and an area of the individual touch driving electrode is substantially less than that defined by the outer contour.

In the disclosed touch display substrate, the common electrode line 20 may have a narrow width constrained by the inner contour 12 area of the touch driving electrode 10.

Figure 4:
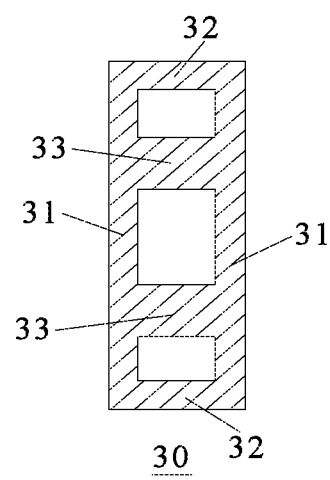
FIG. 4 illustrates a schematic view of touch sensing electrodes according to one embodiment of the present disclosure.

The touch sensing electrodes 30 may have any appropriate shape, as long as fringe field capacitance can be formed properly between the touch sensing electrodes 30 and the corresponding touch driving electrodes 10. For example, as shown in FIG. 4, the touch sensing electrode 30 may include two vertical portions 31 extended in a direction perpendicular to the touch driving electrodes 10 and two first connecting portions 32 connecting both ends of the two vertical portions 31 respectively.

The two vertical portions 31 and the two first connecting portions 32 form an enclosed rectangular frame. The benefit of configuring the touch sensing electrode 30 in this way is the increase of the number of edges of the touch sensing electrode 30 and hence the increased fringe electric fields. Thus, the sensitivity of the touch display substrate is improved.

To increase the fringe electric fields between the touch driving electrode 10 and the touch sensing electrode 30, the touch sensing electrode 30 may include a plurality of second connecting portions 33 positioned between the two first connecting portions 32. Both ends of each second connecting portion 33 are connected to the two vertical portions 31 respectively, an 'H' type structure. Each additional second connecting portion 33 contributes two additional edges to the increase of the fringe electric fields between the touch sensing electrode 30 and the touch driving electrode 10.

Figure 10:
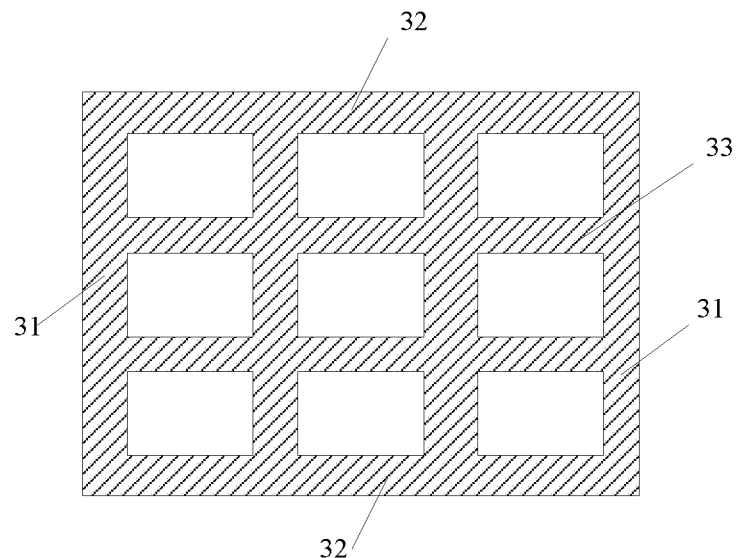
FIG. 10 illustrate a schematic view of a touch sensing electrode according to one embodiment of the present disclosure.

Other structures may also be used for the touch sensing electrode 30. For example, as shown in FIG. 10, the touch sensing electrode 30 may include four vertical portions 31 extended in a direction perpendicular to the touch driving electrodes 10 and two first connecting portions 32 connecting both ends of the four vertical portions 31 respectively. Further, two second connecting portions 33 between the two first connection portions 32. The number of the second connecting portions 33 may be any appropriate numbers, and the number of vertical portions 31 may also be different numbers, such as 1, 3, 5, 6, etc.

Figure 11:
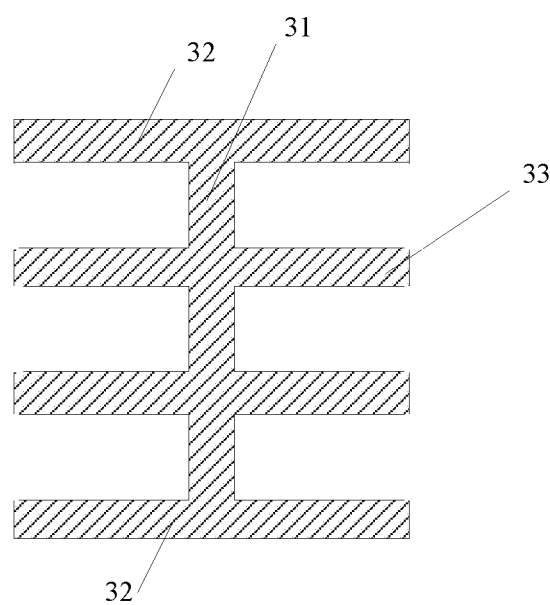
FIG. 11 illustrates a schematic view of a touch sensing electrode according to another embodiment of the present disclosure.

For example, as shown in FIG. 11, the touch sensing electrode 30 may include only one vertical portion 31 extended in a direction perpendicular to the touch driving electrodes 10 and two first connecting portions 32 connecting both ends of the vertical portion 31 respectively. Further, two second connecting portions 33 between the two first connection portions 32. Different number of second connecting portions 33 may also be used. In certain embodiments, one or both first connecting portions 32 may be omitted.

Further, a projection of second connecting portion 33 on the surface of the touch display substrate may fall within the area confined by the touch driving electrodes 10. As shown in FIG. 2, the touch driving electrode 10 is formed in a shape of enclosed frame, and the projection of the second connecting portion 33 falls within the hollow portion of the touch driving electrode 10. That is, the projection of the second connecting portion 33 does not overlap with the touch driving electrodes 10. Thus, the aperture ratio of the touch display substrate is not affected.

Generally, the touch display substrate may also include a plurality of touch driving electrode leads 40 supplying touch driving signals to the plurality of the touch driving electrodes 10.

In one embodiment, the plurality of the touch driving electrodes 10 may also serve as the common electrode lines 20. That is, the common electrode lines 20 are not provided. In this case, the touch driving signals are time divided into cycles when images are displayed on the display panel having the disclosed touch display substrate. Each cycle includes a touch driving phase and a display phase. In the touch driving phase, the touch driving electrode leads 40 supply the touch driving signals to the touch driving electrodes 10. In the display phase, the touch driving electrode leads 40 supply a common voltage signal to the touch driving electrodes 10, because the touch driving electrodes 10 are used as the common electrode lines.

In certain embodiments, as shown in FIG. 2, both the plurality of the touch driving electrodes 10 and the plurality of common electrode lines 20 are provided. That is, both the touch driving electrodes 10 and the common electrode lines 20 can serve as common electrode lines. Accordingly, the touch display substrate may also include common electrode line leads 50 supplying a common voltage signal to the plurality of the common electrode lines 20.

The common electrode lines 20 may be configured in a same layer as the touch driving electrodes 10 and are insulated from the touch driving electrodes 10. The common electrode line leads 50 may be configured in a layer different from the common electrode lines 20 layer. The common electrode line leads 50 are electrically connected to the corresponding common electrode lines 20 through via holes, which may be positioned at any appropriate locations on the common electrode line leads 50. In one embodiment, as shown in FIG. 2, the common electrode line leads 50 are configured in a same layer as the touch sensing electrodes 30.

Accordingly, in the touch-control phase, the touch driving electrode leads 40 supply the touch driving signals to the touch driving electrodes 10. In the display phase, the touch driving electrode leads 40 supply a common voltage signal to the touch driving electrodes 10, because the touch driving electrodes 10 are used as the common electrode lines, and, at the same time, the common electrode line leads 50 supply a common voltage signal to the common electrode lines 20.

In one embodiment, the common electrode lines 20 and the touch driving electrodes 10 may be made of transparent electrode materials (such as ITO). The touch sensing electrodes 30 may also be made of transparent electrode materials (such as ITO).

Figure 9:
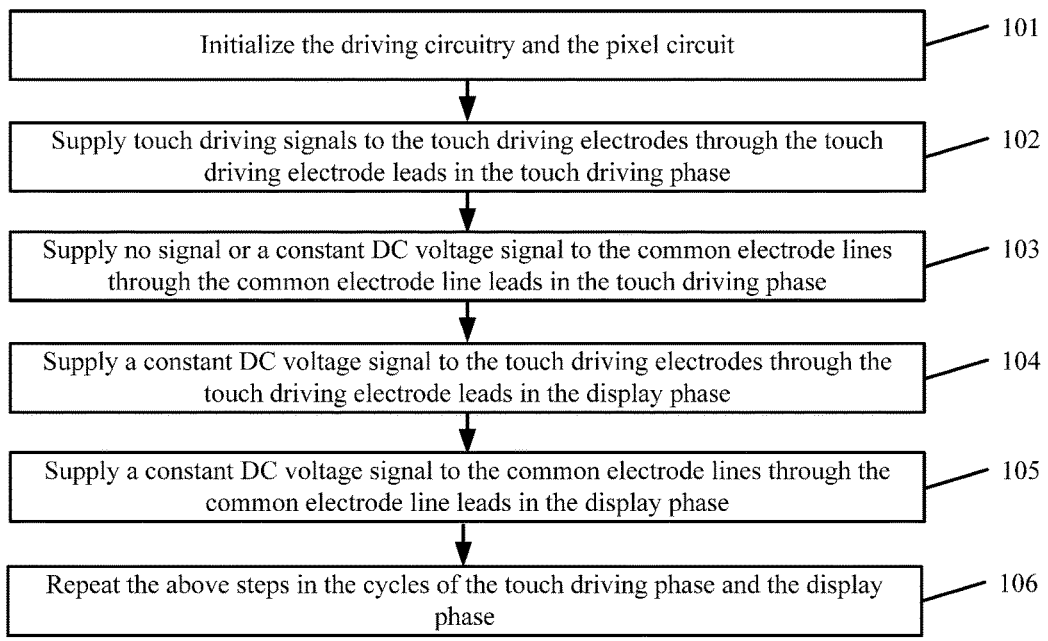
FIG. 9 illustrates a flow chart of an exemplary driving method for a touch display panel according to one embodiment of the present disclosure.

The present disclosure also provides a method of driving the touch display apparatus described above. In one embodiment, the touch display apparatus is driven in a time division mode of display cycles. The display cycle includes a touch driving phase and a display phase. FIG. 9 illustrates a flow chart of an exemplary method of driving a touch display apparatus according to one embodiment of the present disclosure. As shown in FIG. 9, the driving method includes the following steps.

Step 101: initialize the driving circuitry and pixel circuit. For example, based on specific configurations, e.g., with or without common electrodes 20 in FIG. 2, driving circuitry and the pixel circuit may be initialized.

Step 102: touch driving signals are supplied to the touch driving electrodes through the touch driving electrode leads in the touch driving phase. The touch driving signals are pulse scanning signals, which scan a plurality of the touch driving electrodes 10 sequentially while the common voltage signals are constant DC voltage signals.

Step 103: non signal or a constant DC voltage signal is supplied to the common electrode lines through the common electrode line leads in the touch driving phase.

Step 104: a constant DC voltage signal is supplied to the touch drive electrodes through the touch driving electrode leads in the display phase.

Step 105: a constant DC voltage signal is supplied to the common electrode lines through the common electrode line leads in the display phase.

Step 106: the above steps are repeated in the cycles of the touch driving phase and the display phase.

In the touch driving phase, no touch driving signals are supplied to the common electrode lines 20. However, in the display phase, the common signals are supplied to the common electrode lines 20 to make the touch display apparatus display images. Of course, in the touch driving phase, the common electrode lines 20 may also be floated (i.e., no signal is supplied).

In the touch driving phase, the common voltage signals may be supplied to the common electrode lines 20. Thus, the common electrode lines 20 are supplied with the common voltage signals during the entire display cycle. Because no change occurs to the signal state of the common electrode lines, the circuit that supplies the common voltage signals to the common electrode lines 20 can be simplified. Specifically, the circuit that supplies the common signals to the common electrode lines 20 only needs to maintain a constant DC voltage signal without any time sequence control. As such, the circuit is substantially simple.

Thus, the present disclosure provides an improved in-cell touch display substrate and its driving method. The touch display substrate includes the touch driving electrodes and the touch sensing electrodes that are configured in special patterns.

Under such configuration, the touch driving electrode occupies an area substantially smaller than its outer contour. When touch driving signals are supplied to the touch driving electrodes, the touch driving electrodes have substantially smaller parasitic capacitances between the touch driving electrodes and other conductive structures of the touch display substrate (such as gate electrode, source/drain electrodes of thin film transistors, data lines, and pixel electrodes, etc.). The reduced parasitic capacitance shortens the touch driving signal delay and reduces the power consumption.

The touch driving electrode also has increased number of edges. The effective capacitance in the touch-control phase is the total fringe field capacitance between the edges of the touch driving electrodes and the touch sensing electrodes. Because the number of edges of the touch driving electrodes increases and the intensity of the signals supplied to the touch driving electrodes remains the same, the total fringe field capacitance increases. The increased total fringe filed capacitance improves the touch sensitivity.

It should be understood that the exemplary embodiments disclosed above are intended for illustrating the operation principles of the present invention. The present invention is not limited thereto. Anyone skilled in the art may make various changes and modifications without departing from the spirit and scope of the present invention. Therefore the scope of the present invention should be defined by the claims thereof.

What is claimed is:
1. A touch display panel, comprising:
a plurality of touch driving electrodes; and
a plurality of touch sensing electrodes intersecting with and electrically insulated from the plurality of the touch driving electrodes,
wherein:
an individual touch driving electrode of the plurality of touch driving electrodes has an outer contour and an inner contour, the inner contour at least partially defining an area allowing a common electrode to be disposed therein, and an area of the individual touch driving electrode is substantially less than that defined by the outer contour,
each touch sensing electrode includes:
two vertical portions extended in a direction perpendicular to a length direction of the touch driving electrode, two first connecting portions connecting with the two vertical portions at both ends of the touch sensing electrode, and a plurality of second connecting portions positioned between the two first connecting portions, the second connecting portions connecting with the two vertical portions to form an H-type structure.

2. The touch display panel of claim 1, wherein:
the outer contour defines an overall outside shape occupied by the touch driving electrode; and
the inner contour defines an overall inside void within the touch driving electrode.

3. The touch display panel of claim 2, wherein:
the outer contour has a quadrangular shape; and
the inner contour defines the area for the common electrode to increase a total number of edges of the individual touch driving electrode contributing to fringe field capacitance between the touch driving electrode and a corresponding touch sensing electrode.

4. The touch display panel of claim 2, wherein the individual touch driving electrode is in a shape of an enclosed frame with a hollow center portion as defined by the inner contour.

5. The touch display panel of claim 2, wherein the individual touch driving electrode is in a shape of an open frame with a hollow center portion as the inner contour.

6. The touch display panel of claim 5, further including:
a plurality of common electrode line leads supplying common electrode signals to the plurality of common electrodes lines,
wherein the common electrode line leads and the common electrode lines are formed at a same layer.

7. The touch display panel of claim 1, further including:
a plurality of common electrode lines positioned within and confined by the inner contours of the plurality of touch driving electrodes, the common electrode lines being electrically insulated from the touch driving electrodes.

8. The touch display panel of claim 7, further including:
a plurality of common electrode line leads supplying common electrode signals to the plurality of common electrodes lines,
wherein the common electrode line leads and the common electrode lines are formed in different layers; and
the common electrode line leads are electrically connected to the common electrode lines through via holes.

9. The touch display panel of claim 1, wherein:
projection of the second connecting portions onto a layer forming the touch driving electrodes falls within areas confined by the inner contours of the touch driving electrodes.

10. The touch display panel of claim 1, further including:
a plurality of touch driving electrode leads for respectively supplying touch driving signals to the plurality of touch driving electrodes during a touch driving phase of the touch display panel, and for respectively common voltage signals to touch driving electrodes during the display phase, when the plurality of touch driving electrodes also serve as common electrode lines.

11. The touch display panel of claim 1, wherein: the touch display panel comprises two substrates, the touch driving electrodes and the touch sensing electrodes are placed on different substrates.

12. A touch display apparatus comprising the touch display panel of claim 1.

13. A driving method for a touch display panel having a plurality of touch driving electrodes, a plurality of touch sensing electrodes intersecting with and electrically insulated from the plurality of the touch driving electrodes, and a plurality of common electrode lines electrically insulated from the touch driving electrodes, wherein an individual touch driving electrode of the plurality of touch driving electrodes has an outer contour and an inner contour, the inner contour is configured to allow a common electrode to be disposed within, an area of the individual touch driving electrode is substantially less than that of the outer contour, and the common electrode lines are positioned within and confined by the inner contours of the plurality of touch driving electrodes, the driving method comprising:

supplying touch driving signals to the touch driving electrodes in a touch driving phase, and supplying a common voltage signal to the touch driving electrodes in a display phase, including:

supplying the common voltage signal to the touch driving electrodes and the common voltage signal to the common electrode lines in the display phase; and supplying no signal or a constant DC voltage signal to the common electrode lines in the touch driving phase.

* * * * *